Aug. 31, 1965  A. D. STRUBLE, JR  3,203,646
BALLOON HAVING REDUCED WIND DRAG
Filed April 3, 1963

3,203,646
BALLOON HAVING REDUCED WIND DRAG
Arthur D. Struble, Jr., 2101 Rosita Place,
Palos Verdes Estates, Calif.
Filed Apr. 3, 1963, Ser. No. 270,416
1 Claim. (Cl. 244—31)

This invention generally relates to balloons having reduced wind drag characteristics, and in particular it relates to tethered balloons designed for use at high altitudes.

At present it appears that balloons will be increasingly called upon to perform such functions as gathering information as to the weather at high altitudes, studying outer space and also military reconnaissance. Many such balloons are intended to ascend to an altitude of from 100,000 to 200,000 feet.

One of the primary problems connected with such balloons, especially tethered balloons, are the adverse effects of wind drag upon the balloon during its ascent. If the balloon exhibits high drag characteristics while ascending, the balloon will climb slowly and drag out more cable because the wind has more time to blow it horizontally. A condition can arise where there is so much cable out that merely due to the weight and drag of the cable, the balloon lofting procedure will not be successful. Thus, a fast rising balloon having low wind drag characteristics is highly desirable for many purposes.

It is therefore the primary object of this invention to provide a novel balloon construction which will exhibit less wind drag under adverse wind conditions.

These and other objects and advantages will be apparent after reading the following detailed description with the drawings, wherein FIGURE 1 is a side view of a tethered balloon;

The present invention broadly involves constructing the balloon so that the balloon envelope on the forward portion of the balloon is maintained under higher pressure than other parts of the balloon envelope. One of the easiest ways of maintaining the envelope on the forward portion of the balloon under a higher pressure than other parts of the envelope is to construct the balloon so that it has at least two separate compartments. The compartment in the forward portion of the balloon is then supplied with gas under higher pressure than a compartment near the middle and/or rear of the balloon. For the purposes of this discussion and in the following claims, the term "forward portion of the balloon" shall mean the "nose portion" or that portion which is designed to face the prevailing winds, regardless of the direction that such wind may be coming from.

Figure 1:
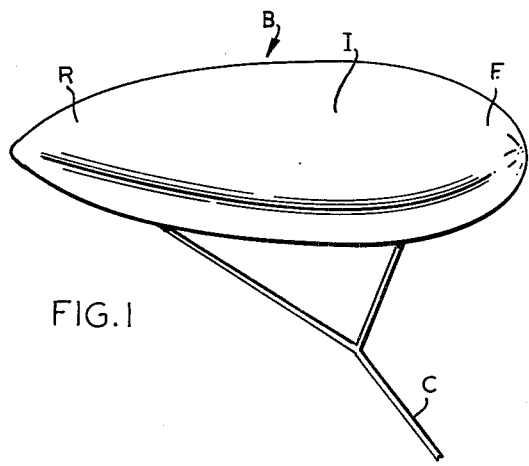
Figure 2:
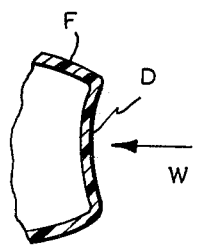
FIGURE 2 is a fragmentary cross-sectional view of the front end of the balloon of FIGURE 1 after the forward end of said balloon has been "dished in" by wind.

Referring now to the drawings, FIGURE 1 shows a balloon B tethered to a cable means C. The balloon B has a forward section F (which is designed to face the direction of the oncoming prevailing winds), a rear section R and an intermediate section I. Balloons of this general shape and configuration are not new and have been used for high altitude ascensions. However, when balloons of this sort merely consist of one large gas compartment, or several gas compartments which are each under the same pressure, undesirable wind drag problems can arise. Specifically, when the forward section F encounters a stiff wind, and particularly at low altitudes, the forward section F can become "dished" inwardly somewhat in the manner indicated by D in the fragmentary cross-sectional view shown in FIGURE 2. When such "dishing" occurs, the balloon presents a less streamline configuration to the wind, with the result that the balloon is more easily forced in a horizontal direction by the wind W. When the balloon is tethered and it is forced in a horizontal direction, the balloon will either be prevented from achieving the desired altitude or the ascent to the desired altitude will be greatly delayed.

Figure 3:
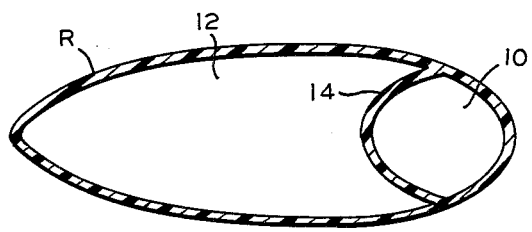
FIGURE 3 is a cross-sectional view of a balloon in accordance with this invention.

FIGURE 3 shows a cross-sectional view of a balloon constructed in accordance with this invention. It will be noted in this cross-sectional view that the forward portion of the balloon contains a gas compartment 10 and the remainder of the balloon consists of a gas compartment 12. Gas compartment 10 has here been formed by constructing a compartment wall 14 within the balloon. Compartment wall 14 is normally bowed toward the rear R of the balloon because the gas within compartment 10 should be under higher pressure than the gas in compartment 12. When the gas in compartment 10 is of higher pressure than the gas in compartment 12 (and of course under higher pressure than the lift gas which would normally be in a balloon), the forward portion of the balloon will resist "dishing" to a greater extent than if no such compartment was present. Although the exact size of the forward compartment 10 as well as the pressure therein will vary with the size of the balloon, the wind conditions in the locality, the altitude to be reached, as well as other factors, the primary consideration is to design the size and pressure within the forward compartment so that "dishing" is either minimized or completely eliminated. Preferably, the forward compartment is pressurized to at least two to three times the dynamic pressure at operational altitude. The remainder of the balloon is preferably superpressured to at least two to three times the static head at altitude.

Figure 4:
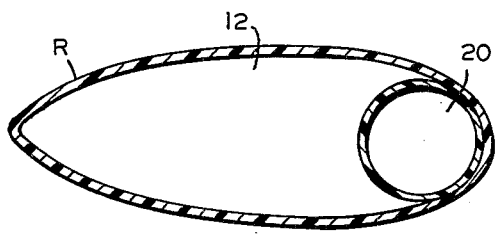
FIGURE 4 is a cross-sectional view of another balloon in accordance with this invention.

FIGURE 4 shows a slightly different embodiment of the invention wherein the separate high pressure forward compartment 20 is a separate compartment positioned within the forward portion of the balloon. This separate compartment 20 may be attached to the interior of the main balloon envelope in any of a number of ways such as detachable snaps, stitching, heat sealing, adhesives, etc. Also, the separate compartment 20 may be made of the same material as the main balloon envelope, or it may be made of much stronger material in order to better accommodate the high pressures therein.

While this invention has been illustrated in connection with balloons having a generally cigar-shaped configuration, the invention is not limited thereto. It is contemplated that the pressurized front compartment of this invention can be used with a wide variety of sizes and shapes of balloons. Balloons in the shape of an arrow or a wing could very well be used in connection with the invention.

What is claimed is:

A balloon of reduced wind drag characteristics comprising an outer balloon gas retaining envelope of generally cigarshaped configuration, the gas space within said envelope being divided into at least two separate compartments, one of said compartments being essentially spherical and being located in the forward end of said balloon and containing gas under higher pressure than the gas in any other compartment of the balloon whereby said spherical compartment cooperates with said outer gas retaining envelope to resist dishing and provide the balloon with low drag characteristics.

References Cited by the Examiner

UNITED STATES PATENTS

| | | | |
|---|---|---|---|
| 1,290,979 | 1/19 | Griffith | 244—126 |
| 1,364,596 | 1/21 | Wales | 244—125 |
| 2,431,938 | 12/47 | Jalbert | 244—33 |
| 2,492,800 | 12/49 | Isom | 244—31 |
| 2,967,573 | 1/61 | Johnson | 244—123 X |
| 3,116,037 | 12/64 | Yost | 244—31 |

MILTON BUCHLER, *Primary Examiner.*

FERGUS S. MIDDLETON, *Examiner.*